United States Patent
Kayama

(10) Patent No.: US 10,506,119 B2
(45) Date of Patent: Dec. 10, 2019

(54) INFORMATION PROCESSING SYSTEM, POST-PROCESSING APPARATUS, CONTROL METHOD FOR SHEET FEEDING

(71) Applicant: CANON KABUSHIKI KAISHA, Tokyo (JP)

(72) Inventor: Hiroyuki Kayama, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/051,900

(22) Filed: Aug. 1, 2018

(65) Prior Publication Data

US 2019/0052763 A1    Feb. 14, 2019

(30) Foreign Application Priority Data

Aug. 9, 2017    (JP) .................................. 2017-154600

(51) Int. Cl.
*H04N 1/00*    (2006.01)
*G06F 3/12*    (2006.01)

(52) U.S. Cl.
CPC ....... *H04N 1/00724* (2013.01); *G06F 3/1207* (2013.01); *G06F 3/1259* (2013.01); *G06F 3/1287* (2013.01); *H04N 1/00689* (2013.01); *H04N 1/00692* (2013.01); *H04N 1/00694* (2013.01)

(58) Field of Classification Search
CPC ........... H04N 1/00724; H04N 1/00689; H04N 1/00694; H04N 1/00692; G06F 3/1287; G06F 3/1259; G06F 3/1207
See application file for complete search history.

(56) References Cited

U.S. PATENT DOCUMENTS

| | | | |
|---|---|---|---|
| 2003/0095280 A1* | 5/2003 | Sunada | H04N 1/00411 358/1.14 |
| 2005/0168767 A1* | 8/2005 | Moroney | G06K 15/00 358/1.14 |
| 2010/0271672 A1* | 10/2010 | Nakamichi | H04N 1/0057 358/498 |
| 2012/0218596 A1* | 8/2012 | Hashimoto | G06F 3/1207 358/1.15 |
| 2013/0272741 A1* | 10/2013 | Morita | G03G 15/6582 399/82 |
| 2014/0035985 A1* | 2/2014 | Arakane | B41J 13/0009 347/16 |
| 2016/0016750 A1* | 1/2016 | Wakide | B65H 31/36 358/1.12 |

FOREIGN PATENT DOCUMENTS

JP    2002-262006 A    9/2002

* cited by examiner

*Primary Examiner* — Neil R McLean
(74) *Attorney, Agent, or Firm* — Canon USA, Inc., IP Division

(57) ABSTRACT

A post-processing apparatus acquires a status of an image forming apparatus and sheet information of sheet feeders in the image forming apparatus, and when determining that sheets used in a print job that the image forming apparatus is instructed to perform need to be fed on the basis of the acquired status and sheet information, transmits information on the sheet feeding together with an instruction to perform the print job to the image forming apparatus when instructing the image forming apparatus to perform the print job.

15 Claims, 14 Drawing Sheets

```
<JMF xmlns="http://www.CIP4.org/JDFSchema_1_1" MaxVersion="1.5" SenderID="Printer TimeStamp="2017-
08-1T8:23:12+02:00" Version="1.5" xmlns:xsi="http://www.w3.org/2001/XMLSchema-instance">
   <Query ID="0001" Type="Status" xsi:type="QueryStatus">
     <StatusQuParams JobDetails="Brief" QueueInfo="true"/>     61001
   </Query>                                                    61002
</JMF>
```

```
<JMF xmlns="http://www.CIP4.org/JDFSchema_1_1" MaxVersion="1.5" SenderID="Printer TimeStamp="2017-
08-1T8:23:15+02:00" Version="1.5" xmlns:xsi="http://www.w3.org/2001/XMLSchema-instance">
   <Response ID="0001" ReturnCoce="0" Type="Status" xsi-type="ResponceStatus">
     <DeviceInfo DeviceID="Printer A" DeviceStatus="Running">
       <JobPhase JobID="ID001" QueueEntryID="ID001" Status="Processing" />
     </DeviceInfo>                                                        61011
   </Responce>
</JMF>
```

FIG. 7A

```
                  ┌─6102
<JMF xmlns="http://www.CIP4.org/JDFSchema_1_1" MaxVersion="1.5" SenderID="Printer TimeStamp="2017-
08-1T9:24:12+02:00" Version="1.5" xmlns:xsi="http://www.w3.org/2001/XMLSchema-instance">
   <Query ID="Q0002" Type="Resource" xsi:type="QueryResource">
      <ResourceQuParams ResourceName="Media" Scope="Allowed"/>  ─61021
   </Query>                                              ─61022
</JMF>
```

FIG. 7B

```
                  ┌─6103
<JMF xmlns="http://www.CIP4.org/JDFSchema_1_1" MaxVersion="1.5" SenderID="Printer TimeStamp="2017-
08-1T8:23:15+02:00" Version="1.5" xmlns:xsi="http://www.w3.org/2001/XMLSchema-instance" >
   <Response ID="Q0002" ReturnCoce="0" Type="Resource" xsi:type="QueryResource">
      <ResourceInfo Level="OK" DescriptiveName="Paper A" ResourceName="Media" >
         <Media Class="Consumable" DescriptiveName="Paper A" Dimension="595 841" Weight="80" />
         <AmountPool>                                                                  ─61031
            <PartAmount Orientation="Rotate0" ActualAmount="500">─61032
               <Part Location="Tray-1" />
            </PartAmount>         ─61033
            <PartAmount Orientation="Rotate0" ActualAmount="200">
               <Part Location="Tray-2" />
            </PartAmount>
         </AmountPool>
      </ResourceInfo>
      <ResourceInfo Level="OK" DescriptiveName="PaperA" ResourceName="Media">
         <Media Class="Consumable" DescriptiveName="Paper B" Dimension="841 1191" Weight="100" />
         <AmountPool>
            <PartAmount Orientation="Rotate90" ActualAmount="300">
               <Part Location="Tray-3">
            </PartAmount>
         </AmountPool>
      </ResourceInfo>
   </Response>
</JMF>
```

FIG. 8A

```
/ 6104
<JMF xmlns="http://www.CIP4.org/JDFSchema_1_1" MaxVersion="1.5" SenderID="Finisher"
 TimeStamp="2016-09-18T11:15:30+02:00" Version="1.5" xmlns:xsi="http://www.w3.org/2001/XMLSchema-
 instance" xsi:type="JMFRootMessage">
    <Command ID="C0003" Type="ResubmitQueueEntry">       ~61041
        <QueeEntryID="ID001">
        <Media DescriptiveName="Paper A" Dimention="595 841" />    ~61042
        <ResourceInfo Level="NG">    ~61043
    </Command>
</JMF>
```

FIG. 8B

```
/ 6105
<JMF xmlns="http://www.CIP4.org/JDFSchema_1_1" MaxVersion="1.5" SenderID="Finisher"
 TimeStamp="2016-09-18T11:15:30+02:00" Version="1.5" xmlns:xsi="http://www.w3.org/2001/XMLSchema-
 instance" xsi:type="JMFRootMessage">
    <Command ID="C0003" Type="ResubmitQueueEntry">       ~61051
        <QueeEntryID="ID001">
        <Media DescriptiveName="Paper A" Dimention="595 841" />    ~61052
        <ResourceInfo Insert="Yes">    ~61053
    </Command>
</JMF>
```

FIG. 8C

```
/ 6106
<JMF xmlns="http://www.CIP4.org/JDFSchema_1_1" MaxVersion="1.5" SenderID="Finisher"
 TimeStamp="2016-09-18T11:15:30+02:00" Version="1.5" xmlns:xsi="http://www.w3.org/2001/XMLSchema-
 instance" xsi:type="JMFRootMessage">
    <Command ID="C0003" Type="ResubmitQueueEntry">       ~61061
        <QueeEntryID="ID001">
        <Media DescriptiveName="Paper A" Dimention="595 841" />    ~61062
        <ResourceInfo Location="Tray-1" SetAmount="150">    ~61063
    </Command>
</JMF>
```

FIG. 13

JOB CANCEL
JOB IS CANCELED. INPUT WORK AFTER CANCELLATION.

RECOVERY PLACE:
- ○ COMPUTER      ADDRESS: [        ]
- ● PRINTER       ADDRESS: [xxx.xxx.xxx.xxx]
- ○ FINISHER WORK:
- ○ CONTINUE POST-PROCESSING
- ○ RESET
- ○ RECREATE DATA
- ○ WAIT UNTIL COMPLETION OF ALL MANUFACTURE
- ● REPRINT

[DETAILS]

[OK] [CANCEL]

1000
10001
10002
10003

INFORMATION PROCESSING SYSTEM, POST-PROCESSING APPARATUS, CONTROL METHOD FOR SHEET FEEDING

BACKGROUND OF THE INVENTION

Field of the Invention

One disclosed aspect of the embodiments relates to an information processing system, a post-processing apparatus, a control method for sheet feeding.

Description of the Related Art

Various merged documents have been conventionally generated in combination of an image forming apparatus and a post-processing apparatus under control of an information processing apparatus in the field of commercial printing. For example, a printed material subjected to the print processing by the image forming apparatus is set in the post-processing apparatus to be subjected to post-processings such as binding and cutting thereby to generate a sophisticated merged document.

With the configuration, the information processing apparatus, the image forming apparatus, and the post-processing apparatus mutually establish communication and exchange information via a network or the like. For example, the setting information on the post-processings is transferred from the information processing apparatus to the post-processing apparatus, and the post-processing apparatus reads the setting information thereby to be automatically set, and can perform the post-processings.

On the other hand, various types of sheets are used for merged documents and a large number of sheets are used at one time. Thus, a work of exchanging sheets is frequently performed in the sheet feeders (cassettes) in the image forming apparatus.

Japanese Patent Laid-Open No. 2002-262006 discloses an image forming apparatus for predicting when the number of sheets in each size reaches the set number of sheets depending on the use situation in the past certain period.

However, Japanese Patent Laid-Open No. 2002-262006 does not consider that sheets need to be fed to the image forming apparatus on the basis of the post processings performed in a post-processing apparatus. For example, if the post-processing apparatus fails in a post-processing, the image forming apparatus may be asked to reprint the corresponding printed material in order to retry the processing in the post-processing apparatus. At this time, if sheets required to reprint are not inserted into a sheet feeder in the image forming apparatus, the sheets are lacking during the reprinting processing, and the print processing can stop. That is, if sheet feeding to the image forming apparatus is not considered on the basis of the post-processings performed by the post-processing apparatus, a merged document generation efficiency can lower.

As described above, sheet feeding based on the use situation (history) only in the image forming apparatus in the past certain period is not enough.

SUMMARY OF THE INVENTION

It is an object of the disclosure to provide an information processing system including an image forming apparatus and a post-processing apparatus for post-processing out materials from the image forming apparatus, in which sheet feeding to the image forming apparatus can be appropriately promoted on the basis of the processings in the post-processing apparatus.

An information processing system according to one embodiment includes an image forming apparatus and a post-processing apparatus for post-processing output materials from the image forming apparatus. The post-processing apparatus includes a first acquisition unit, a second acquisition unit, an instruction unit, and a determination unit. The first acquisition unit is configured to acquire a status of the image forming apparatus. The second acquisition unit is configured to acquire sheet information of sheet feeders in the image forming apparatus. The instruction unit is configured to instruct the image forming apparatus to perform a print job. The determination unit is configured to determine whether sheets used in the print job that the image forming apparatus is instructed to perform need to be fed on the basis of the acquired status and sheet information, and when it is determined that the sheets need to be fed, the instruction unit transmits information on the sheet feeding together with an instruction to perform the print job to the image forming apparatus.

Further features of the disclosure will become apparent from the following description of exemplary embodiments (with reference to the attached drawings).

BRIEF DESCRIPTION OF THE DRAWINGS

FIGS. 6A and 6B are diagrams illustrating an apparatus status reception command and its response by way of example.

FIGS. 7A and 7B are diagrams illustrating a resource information reception command and its response by way of example.

FIGS. 8A to 8C are diagrams illustrating exemplary commands to give an instruction to re-perform a job.

FIG. 13 is a diagram illustrating an exemplary user interface for giving an instruction on remanufacture.

DESCRIPTION OF THE EMBODIMENTS

An embodiment for carrying out the disclosure will be described below with reference to the drawings.

[First Embodiment]

<Exemplary Configuration of Information Processing System>

Figure 1:
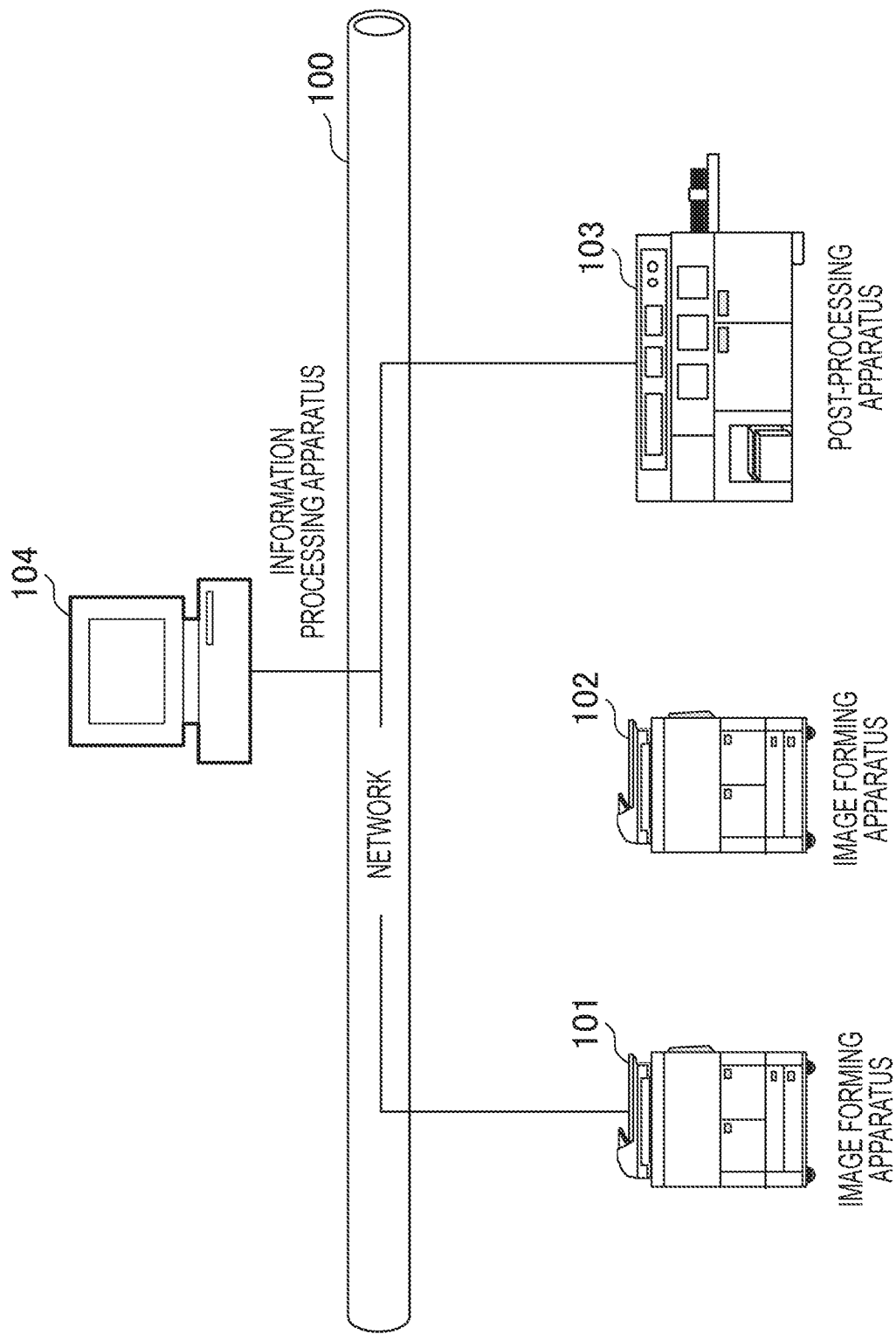
FIG. 1 is a diagram illustrating an entire configuration of an information processing system.

FIG. 1 is a diagram illustrating an entire configuration of an information processing system according to one embodiment.

The environment of the entire information processing system in the following description is intended to facilitate the description of the disclosure to be understood, and the disclosure is not limited to the environment. In FIG. 1, image forming apparatuses 101 and 102, a post-processing apparatus 103, and an information processing apparatus 104 are connected to a network 100.

The image forming apparatus 101, 102 analyzes print data transmitted from the information processing apparatus 104 or the like, and converts each page into a dot image to be printed. The image forming apparatus 101, 102 makes communication with the post-processing apparatus 103 via the network 100, and exchanges control information and the like therewith. A printed material (output material) output from the image forming apparatus 101, 102 is manually passed to the post-processing apparatus 103 by a print operator, or is passed to the post-processing apparatus 103 via a belt conveyer (not illustrated).

More specifically, a printed material of the image forming apparatus 101, 102 may be directly placed on the belt conveyer connected to a sheet discharging unit of the image forming apparatus 101, 102 and is directly fed to the post-processing apparatus 103. A printed material of the image forming apparatus 101, 102 may be temporarily placed in a space for temporarily placing printed materials, and then placed on the belt conveyer or manually carried by an operator to be fed to the post-processing apparatus 103.

The post-processing apparatus 103 performs the post-processings such as cutting, binding, and folding on the printed materials output from the image forming apparatus 101, 102. The post-processing apparatus 103 can make communication with the image forming apparatus 101, 102 or the information processing apparatus 104 via the network 100. The post-processing apparatus 103 may individually process the printed materials from the image forming apparatus 101, 102, or may combine jobs of the image forming apparatuses 101 and 102, and process the jobs into one merged document.

For example, a cutting device is an exemplary form for individually processing the printed materials from the image forming apparatus 101, 102. For example, an adhesive binding device is an exemplary form for combining jobs of the image forming apparatuses 101 and 102 and processing the jobs into one merged document. The adhesive binding device manufactures one adhesively-bound book (case binding) from the front cover as a printed material from the image forming apparatus A and the text as a printed material from the image forming apparatus B, for example.

A workflow management program and programs for a WEB server and the like operate on the information processing apparatus 104. A printer driver program for connecting to the image forming apparatus 101, 102 and the post-processing apparatus 103 via the network 100 and controlling the image forming apparatus 101, 102 is installed in the information processing apparatus 104.

One post-processing apparatus 103 and one information processing apparatus 104 are illustrated in FIG. 1, but several ones may be provided. In particular, if a plurality of post-processing apparatuses 103 are present, the post-processing apparatuses are mutually connected and a merged document of one post-processing apparatus may be passed to the other post-processing apparatus. In the present system, the information processing apparatus 104 may not be present.

That is, the information processing apparatus 101, 102 or the post-processing apparatus 103 may serve as the information processing apparatus 104. In FIG. 1, the present system includes two image forming apparatuses, but is not limited thereto and may include one image forming apparatus or two or more image forming apparatuses.

The network 100 may be the Internet, and may be configured such that the information processing apparatus 104 accesses the image forming apparatus 101, 102 or the post-processing apparatus 103 via the Internet. The image forming apparatuses 101 and 102 are printing apparatuses, and the post-processing apparatus 103 is a printed material processing apparatus.

<Exemplary Hardware Configuration of Information Processing System>

Figure 2:
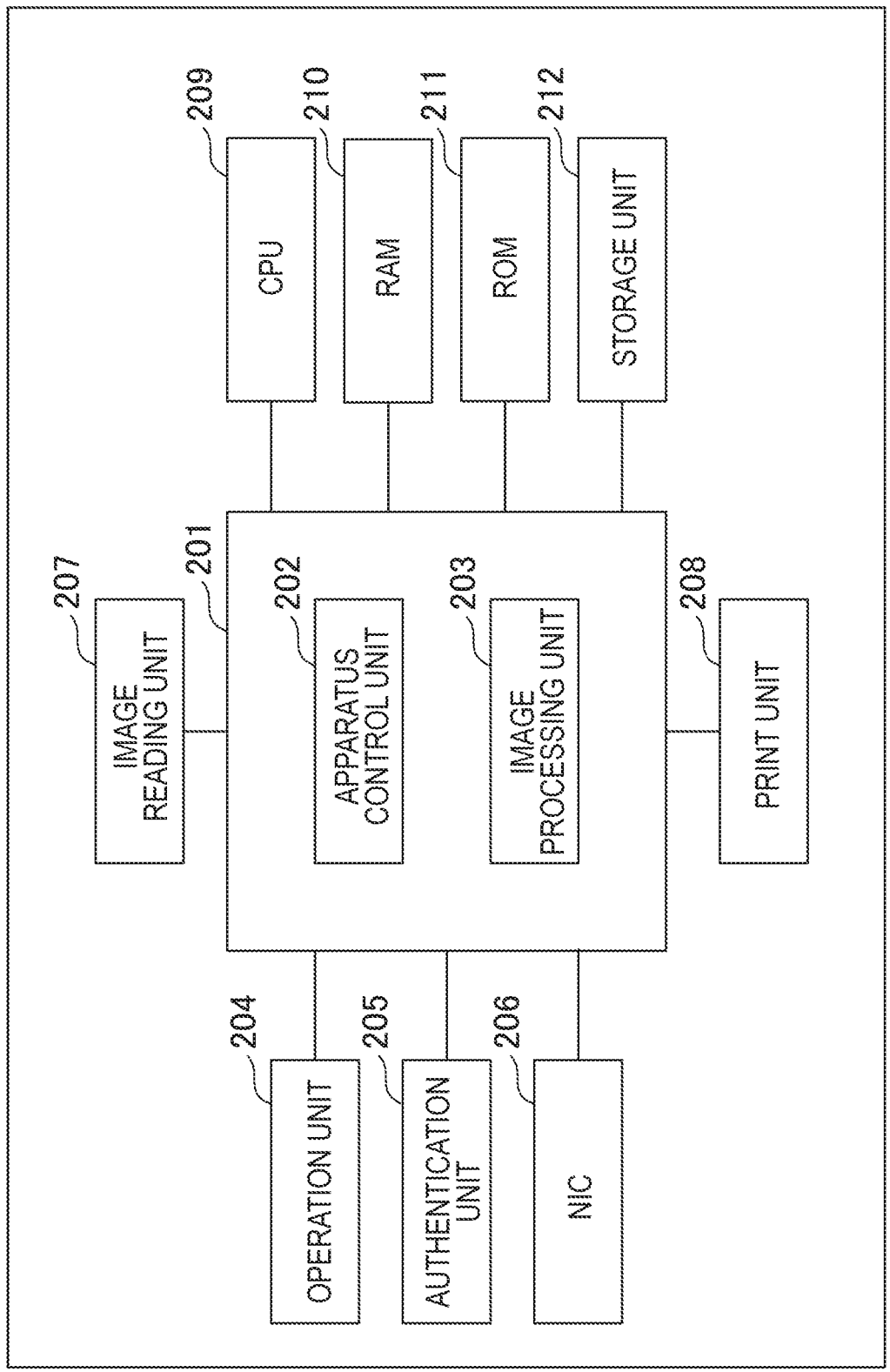
FIG. 2 is a diagram illustrating a hardware configuration of an image forming apparatus.

FIG. 2 is a hardware configuration diagram of the image forming apparatus 101, 102 according to the present embodiment.

The image forming apparatus 101, 102 includes an operation unit 204, an authentication unit 205, a network interface card/controller (NIC) 206, a central processing unit (CPU) 209, a random access memory (RAM) 210, a read only memory (ROM) 211, a storage unit 212, an image reading unit 207, and a print unit 208, which are connected via a control unit 201.

The control unit 201 has an apparatus control unit 202 for controlling the entire image forming apparatus 101, 102, and an image processing unit 203 for processing image data. The operation unit 204 (display unit) is configured of a software keyboard, a touch panel, or other I/O device, for example, and can input and display various setting values.

The CPU 209 executes the programs stored in the ROM 211, or the programs of applications loaded from the storage unit 212 into the RAM 210. That is, the CPU 209 executes the programs stored in the readable storage medium, and functions as each processing unit for performing a processing in each flowchart described below.

The RAM 210 is a main memory of the CPU 209, and functions as a work area or the like. The image reading unit 207 is configured of a scanner, for example, and reads a paper document or the like thereby to acquire a document image in the form of image data. The control unit 201 provides the operation unit 204 with the document images stored in the storage unit 212, and performs the processing of outputting the document images to the operation unit 204.

The control unit 201 similarly provides the print unit 208 with the document images stored in the storage unit 212, and the print unit 208 performs the processing of outputting the document images in various forms. For example, the print unit 208 can perform the processing of outputting the image data of the document images to a storage medium. The print unit 208 has a print function, and may perform the processing of outputting the document images to an output medium such as sheet.

The image forming apparatus 101, 102 is connected to the network 100 via the NIC 206 thereby to exchange data. The data acquired via the NIC 206 can be displayed on the operation unit 204.

Figure 3:
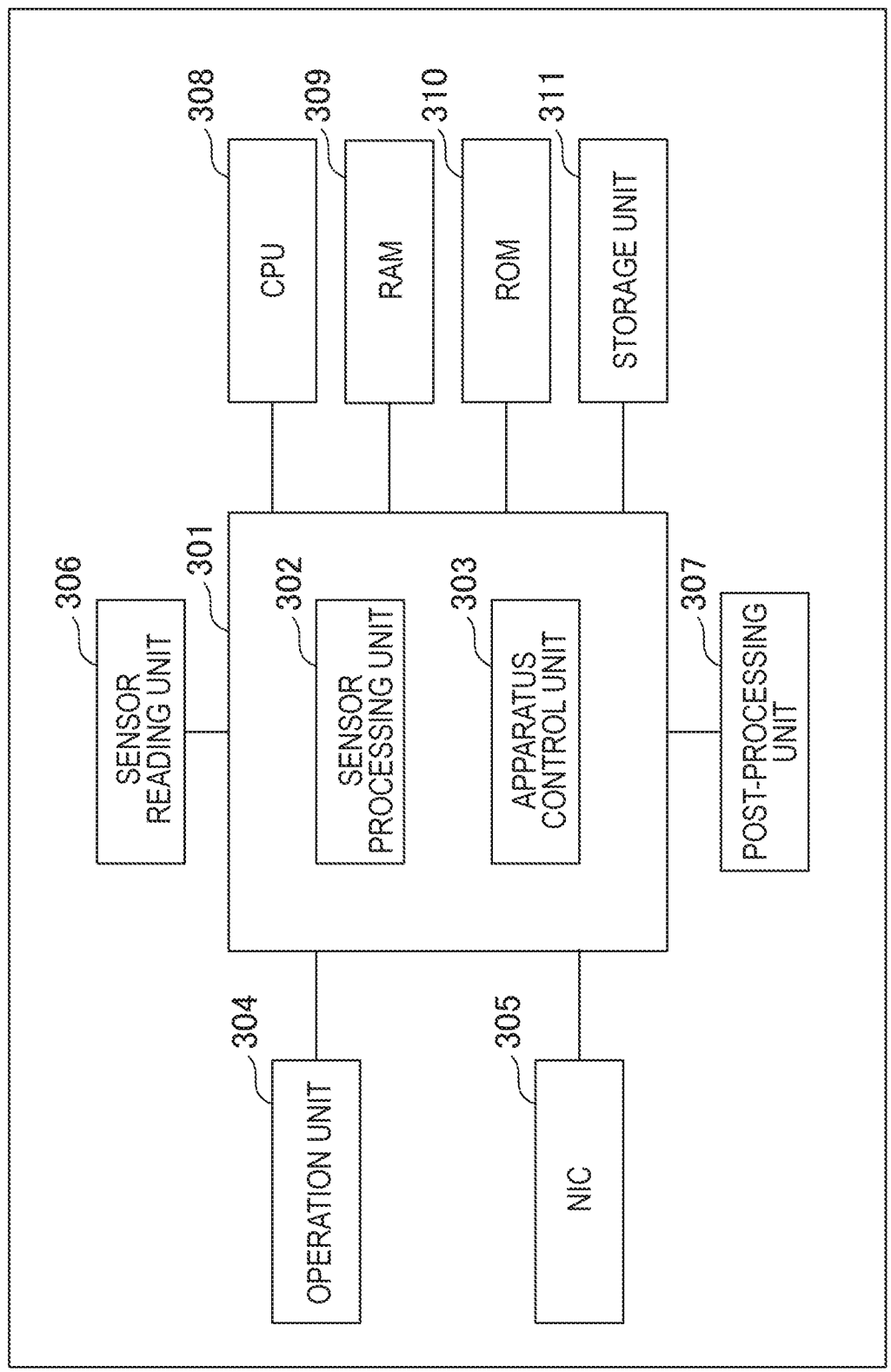
FIG. 3 is a diagram illustrating a hardware configuration of a post-processing apparatus.

FIG. 3 is a hardware configuration diagram of the post-processing apparatus 103 according to the present embodiment.

The post-processing apparatus 103 includes an operation unit 304, a NIC 305, a CPU 308, a RAM 309, a ROM 310, a storage unit 311, a sensor reading unit 306, and a post-processing unit 307, which are connected via a control unit 301.

The control unit 301 has a sensor processing unit 302 for processing sensor information read by the sensor reading unit 306, and an apparatus control unit 303 for controlling the entire post-processing apparatus 103. The operation unit 304 (display unit) is configured of a software keyboard, a touch panel, or other I/O device, for example, and can input and display various setting values.

The CPU 308 executes the programs stored in the ROM 310, or the programs of applications loaded from the storage unit 311 into the RAM 309. That is, the CPU 308 executes the programs stored in the readable storage medium and functions as each processing unit for performing a processing in each flowchart described below.

The RAM 309 is a main memory of the CPU 308, and functions as a work area or the like. The sensor reading unit 306 can read job information of a printed material to be post-processed via a device such as camera. The job information collates a combination of front cover and text in an adhesive binding job, for example.

The control unit 301 provides the operation unit 304 with the post-processing information stored in the storage unit 311, and performs the processing of outputting the setting information on the post-processings to the operation unit 304. The control unit 301 similarly provides the post-processing unit 307 with the post-processing information stored in the storage unit 311, and the post-processing unit 307 performs the post-processings in various forms. The post-processing apparatus 103 is connected to the network 100 via the NIC 305 and can exchange data therewith. The data acquired via the NIC 305 can be displayed on the operation unit 304.

Figure 4:
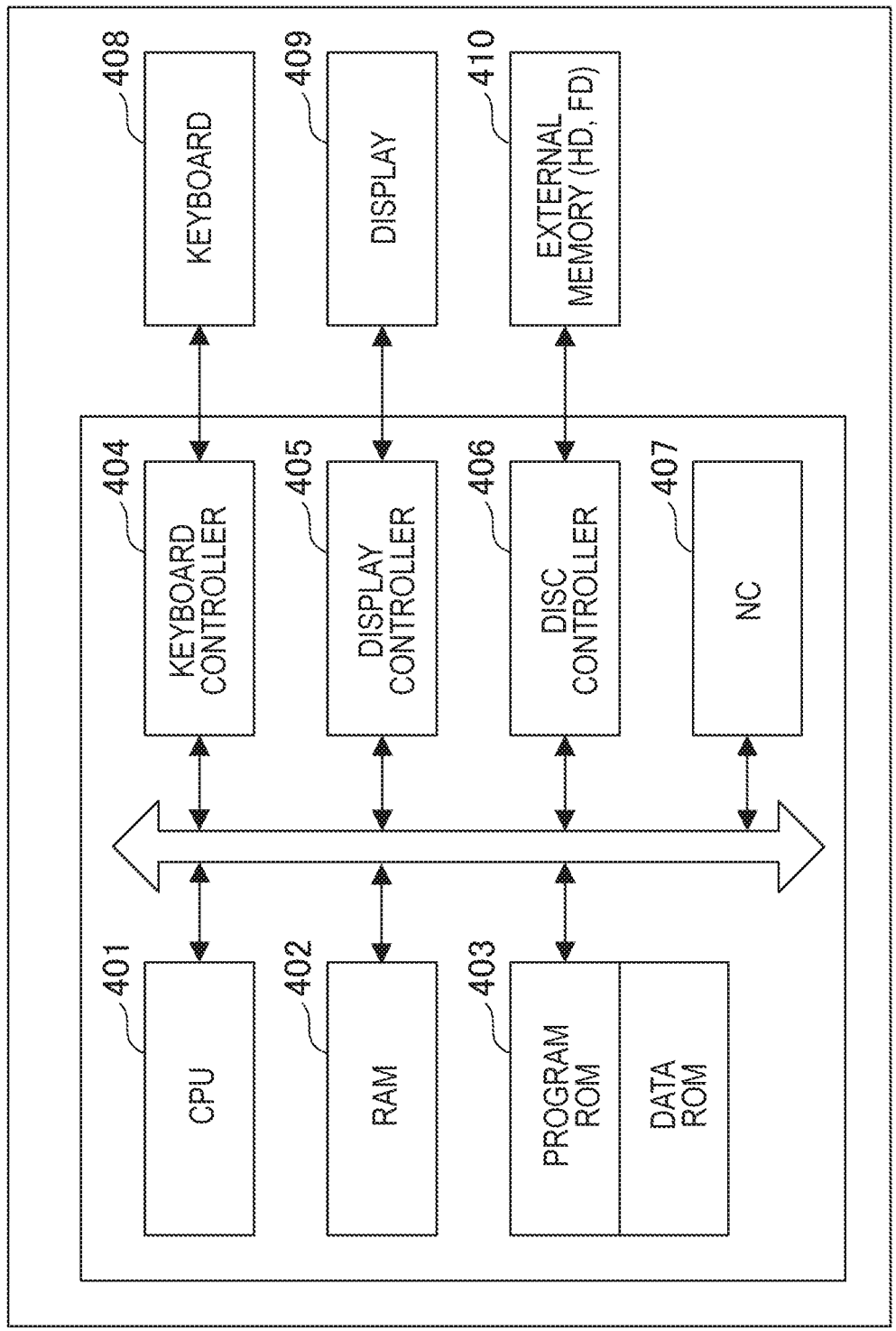
FIG. 4 is a diagram illustrating a hardware configuration of an information processing apparatus.

FIG. 4 is a hardware configuration diagram of the information processing apparatus 104 according to the present embodiment.

The information processing apparatus 104 can be configured in hardware of a typical personal computer (PC). A CPU 401 executes the programs stored in the program ROM in a ROM 403, or the programs of operation system (OS) or applications load from an external memory 410 configured of a hard disc (HD) into a RAM 402.

That is, the CPU 401 executes the programs stored in the readable storage medium and functions as each processing unit for performing a processing in each flowchart described below. The RAM 402 is a main memory of the CPU 401, and functions as a work area or the like.

A keyboard controller 404 controls operational input from a keyboard 408 or a pointing device (such as mouse, touch pad, touch panel, or track ball) (not illustrated). A display controller 405 controls display of a display 409. A disc controller 406 controls data access to the external memory 410 such as hard disc (HD) or flexible disc (FD) storing various items of data therein. A network controller (NC) 407 is connected to the network 100 and performs a communication control processing on other device connected to the network 100.

<Exemplary Software Configuration of Information Processing System>

Figure 5:
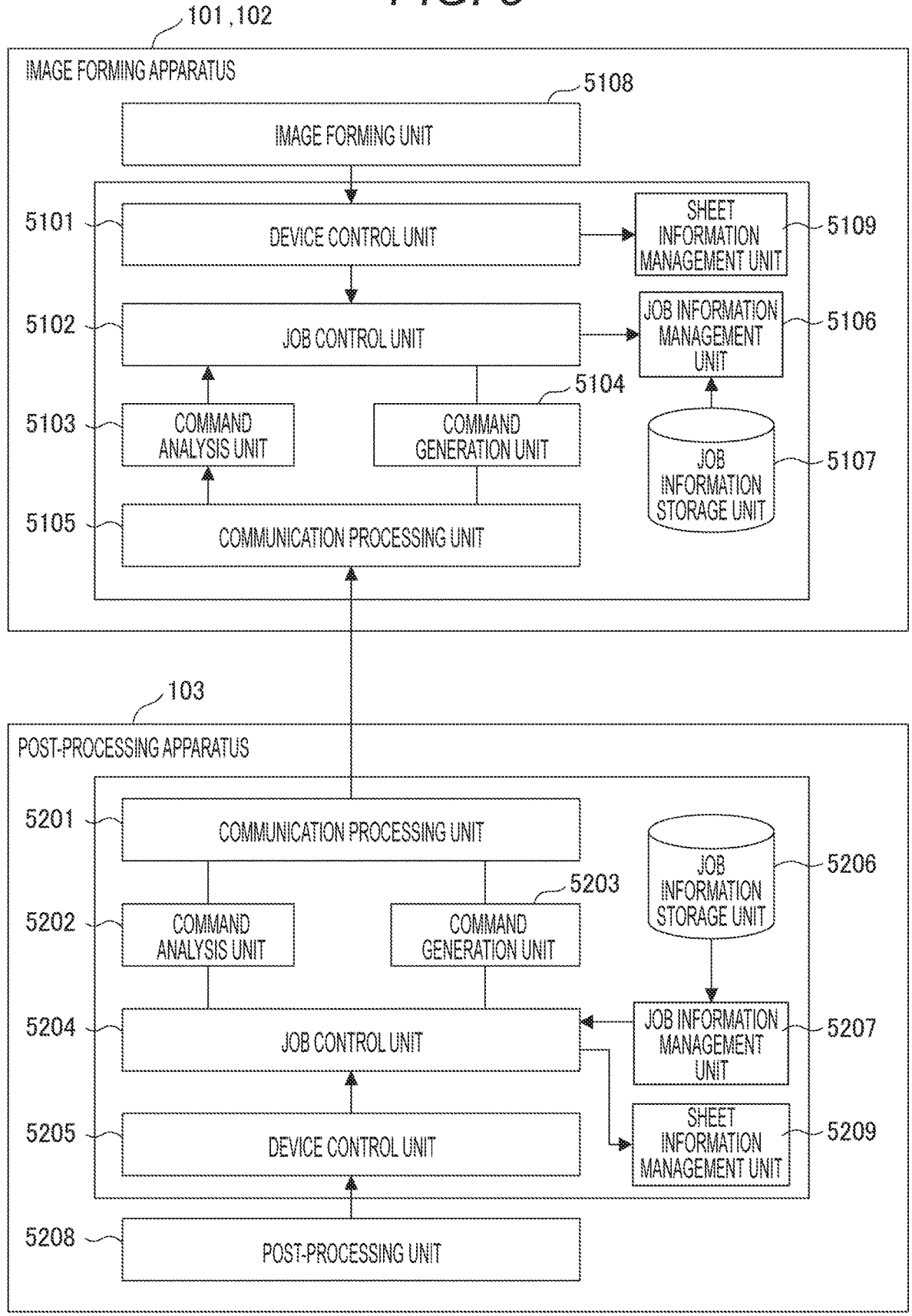
FIG. 5 is a functional block diagram illustrating the respective functions of the image forming apparatus and the post-processing apparatus.

FIG. 5 is a functional block diagram illustrating the respective functions of the image forming apparatus 101, 102 and the post-processing apparatus 103 according to the present embodiment.

The functional block diagram of the image forming apparatus 101, 102 will be first described. A device control unit 5101 controls a print processing of an image forming unit 5108 in response to a print instruction from a job control unit 5102.

The job control unit 5102 controls a processing of a print job. That is, the job control unit 5102 instructs the device control unit 5101 to perform the print processing on the basis of the print job information stored in a job information storage unit 5107 or in response to a command received from the post-processing apparatus 103 or the information processing apparatus 104. The job control unit 5102 sends a command of a post-processing to the post-processing apparatus 103 or the information processing apparatus 104.

A command analysis unit 5103 analyzes commands (commands illustrated in FIGS. 6A and 6B described below) received from the post-processing apparatus 103 or the information processing apparatus 104. A command generation unit 5104 generates commands transmitted to the post-processing apparatus 103 or the information processing apparatus 104, or responses (commands illustrated in FIGS. 6A and 6B described below) to commands received from the post-processing apparatus 103 or the information processing apparatus 104.

A communication processing unit 5105 makes data communication with the post-processing apparatus 103 or the information processing apparatus 104. A job information management unit 5106 manages the print job information stored in the job information storage unit 5107. The job information storage unit 5107 stores information on the print jobs (print job information) for performing the print processing in the image forming apparatus 101, 102.

The print job information stored in the job information storage unit 5107 includes a list of print jobs (not illustrated) in the image forming apparatus 101, 102, or print setting information or image data associated with the print jobs. The print job information includes identification information (job IDs), which is received from the information processing apparatus 104, for uniquely specifying a job in the information processing apparatus 104, the image forming apparatus 101, 102, and the post-processing apparatus 103. The image forming apparatus 101, 102 exchanges the control information with the information processing apparatus 104 and the post-processing apparatus 103 by use of the identification information. The image forming unit 5108 is a processing mechanism for performing the print processing.

A sheet information management unit 5109 manages information of the sheet feeders (cassettes) for feeding sheets as a recording medium in the image forming apparatus 101, 102. The image forming apparatus 101, 102 has a plurality of sheet feeders, and the sheet information management unit 5109 manages the information of each sheet feeder. The information of each sheet feeder is information on the type of sheets set (inserted) in each sheet feeder or the number of sheets inserted in each sheet feeder. The information managed by the sheet information management unit will be denoted as sheet information below.

The type of sheets (sheet type) includes sheet attributes such as sheet size, basis weight, and surface nature. The number of sheets inserted in a sheet feeder is read from a sensor installed in the image forming apparatus 101, 102 or is input by the user via the operation unit 204 thereby to be specified.

The functional block diagram of the post-processing apparatus 103 will be described below. A communication processing unit 5201 makes data communication with the image forming apparatus 101, 102 or the information processing apparatus 104. A command analysis unit 5202 analyzes commands (commands illustrated in FIGS. 6A to 8 described below) received from the image forming apparatus 101, 102 or the information processing apparatus 104.

A command generation unit 5203 generates commands transmitted to the image forming apparatus 101, 102 or the information processing apparatus 104, or responses to commands received from the image forming apparatus 101, 102 or the information processing apparatus 104. Commands and responses to commands generated by the command generation unit 5203 will be described below in detail with reference to FIGS. 6A to 8 by way of example.

A job control unit 5204 controls a processing of a post-processing job of performing a post-processing in the post-processing apparatus 103. Specifically, the job control unit 5204 instructs a device control unit 5205 to perform a post-processing on the basis of the information on the post-processing jobs stored in a job information storage unit 5206 or in response to a command received from the image forming apparatus 101, 102 or the information processing apparatus 104. The job control unit 5204 sends a command of the print processing to the image forming apparatus 101, 102 or the information processing apparatus 104. The device control unit 5205 controls a post-processing of a post-processing unit 5208 in response to a post-processing instruction from the job control unit 5204.

The job information storage unit 5206 stores the information on the post-processing jobs for performing the post-processings in the post-processing apparatus 103. The information on the post-processing jobs includes a list of post-processing jobs in the post-processing apparatus 103 or designation information indicating a post-processing to be performed on each job. For example, the post-processing of performing adhesive binding includes information on sheet size or sheet type of the front cover and the text, finished size, and width of the spine. The information is previously received from the information processing apparatus 104 or the like or is input by a user (operator) via the operation unit 304 in the post-processing apparatus 103.

A job information management unit 5207 manages the information on the post-processing jobs stored in the job information storage unit 5206. The information on the post-processing jobs includes identification information (job IDs), which is received from the information processing apparatus 104, for uniquely specifying a job in the information processing apparatus 104, the image forming apparatus 101, 102, and the post-processing apparatus 103. The post-processing apparatus 103 exchanges the control information with the image forming apparatus 101, 102 and the information processing apparatus 104 by use of the identification information. The post-processing unit 5208 is a processing mechanism for performing the post-processings.

A sheet information management unit 5209 manages the information on the sheets inserted (set) in the sheet feeders in the image forming apparatus 101, 102 and the sheet feeders in the post-processing apparatus 103. Specifically, the sheet information management unit 5209 receives and manages the sheet information managed in the sheet information management unit 5109 in the image forming apparatus 101, 102 via the communication processing unit 5201. The sheet information management unit 5209 manages the information on the sheets inserted in the sheet feeders for feeding printed sheets to be post-processed in the image forming apparatus 101, 102.

The sheet information includes the type of sheets including sheet size and sheet type, the number of sheets, and the like. The number of sheets inserted in the sheet feeders is read by a sensor installed in the post-processing apparatus 103 or is input by a user via the operation unit 204 thereby to be specified.

The sheet information of the image forming apparatus 101, 102 and the post-processing apparatus 103 is managed by the post-processing apparatus 103 in this way so that the sheet information can be grasped by the post-processing apparatus 103 from the image forming processing (printing) to the post-processings. Thus, the post-processing apparatus 103 can appropriately manage the sheets.

The post-processing apparatus 103 can determine and perform the sheet feeding processing described below, and can determine the optimum sheets for the post-processings. When a user is working in the post-processing apparatus 103, the user can be notified of the information on sheet feeding (sheet feeding information) via the operation unit 304 in the post-processing apparatus 103 on a timely manner.

<Exemplary Commands Generated by Information Processing System>

FIGS. 6A to 8C are diagrams illustrating exemplary formats of commands and responses to the commands generated by the command generation unit 5104 in the image forming apparatus 101, 102 and the command generation unit 5203 in the post-processing apparatus 103. According to the present embodiment, it is assumed that the commands are exchanged as commands in the format such as Job Definition Format (JDF) defined by the International Standardizing Body CIP4, for example. A sequence illustrating exchanged commands will be described with reference to FIG. 9.

FIG. 6A illustrates a command to query the communication party about the apparatus status and the job status. According to the present embodiment, the command is called apparatus status reception command or "QueryStatus" command. For example, the apparatus status reception command is transmitted from the post-processing apparatus 103 to the image forming apparatus 101, 102 thereby to query the image forming apparatus 101, 102 about the apparatus status or print job status (processing situation).

The image forming apparatus 101, 102 responds its apparatus status or print job status to the post-processing apparatus 103 when receiving the apparatus status reception command. Thereby, the post-processing apparatus 103 can grasp the apparatus status or the print job status of the image forming apparatus 101, 102. The apparatus status reception command may be periodically transmitted to the communication party in the polling processing, for example, or may be non-periodically transmitted as needed.

A command 6100 is an exemplary apparatus status reception command transmitted from the post-processing apparatus 103 to the image forming apparatus 101, 102. Type="QueryStatus" is described in 61001 to be an apparatus status reception command to query about the status of the image forming apparatus 101, 102. Job Status="Brief" QueueInfo="true" is described in 61002 to be an apparatus status reception command to query about the print job status such as information on print job processing situation of the image forming apparatus 101, 102.

FIG. 6B illustrates a response to the apparatus status reception command of FIG. 6A.

A response 6101 is an exemplary response transmitted as a response to the command 6100 from the image forming apparatus 101, 102 to the post-processing apparatus 103. 61011 indicates the information on a print job present in the image forming apparatus 101, 102. Specifically, the processing situation of Job ID="ID001" indicates Status="Processing" (in progress).

The Job ID notification of which is provided at this time is based on the identification information (job IDs) for uniquely specifying a job in the information processing system. Thus, a print job in the image forming apparatus 101, 102 can be associated with a post-processing job in the post-processing apparatus 103. 6101 indicates that one job is present in the image forming apparatus 101, 102 by way of example, but is not limited thereto. When a plurality of print jobs are present in a queue in the image forming apparatus 101, 102, the information on the print jobs is listed and inserted into a response.

FIG. 7A illustrates a command to query the communication party about the resource information on sheets and consumables. According to the present embodiment, the command is called resource information reception command or "QueryResource" command. For example, the resource information reception command is transmitted from the post-processing apparatus 103 to the image forming apparatus 101, 102 thereby to query the image forming apparatus 101, 102 about the sheet information of the sheet feeders (cassettes) in the image forming apparatus 101, 102. The resource information reception command may be periodically transmitted to the communication party in the polling processing, for example, or may be non-periodically transmitted as needed.

A command 6102 is an exemplary resource information reception command transmitted from the post-processing apparatus 103 to the image forming apparatus 101, 102. Type="QueryResource" is described in 61021 to be a resource information reception command to query about the resource information of the image forming apparatus 101, 102. Further, ResourceName="Media" is described in 61022 to be a resource information reception command to query about the sheet information of the sheet feeders in the image forming apparatus 101, 102.

FIG. 7B illustrates a response to the resource information reception command of FIG. 7A.

A response 6103 is an exemplary response transmitted as a response to the command 6102 from the image forming apparatus 101, 102 to the post-processing apparatus 103. 61031 indicates the sheet information such as the sheet size of Dimension="595 841" (A4) and the sheet type of Weight="80".

61032 indicates that the orientation of the sheets in a sheet feeder is Orientation="Rotate=0" and the number of sheets is ActualAmount="500" (500 sheets). Further, 61033 indicates that the name of a sheet feeder as identification information is Location="Tray-1".

FIGS. 8A to 8C illustrate commands to instruct the communication party to re-perform the job once processed by the communication party. According to the present embodiment, the command is called reprocessing command or "ResubmitQueueEntry" command. For example, when the post-processing apparatus 103 fails in a post-processing, a reprocessing command is transmitted from the post-processing apparatus 103 to the image forming apparatus 101, 102 thereby to instruct the image forming apparatus 101, 102 to re-perform the once-performed print job.

The reprocessing command can include the sheet information for the communication party to perform the reprocessing. Thereby, the apparatus which issues the reprocessing command can determine the appropriate sheets used by the communication party to perform the reprocessing depending on the cause of failure of the processing in the apparatus, and can notify the communication party of the determination. In the above example, the post-processing of the post-processing apparatus 103 fails due to the sheets, the post-processing apparatus 103 determines the appropriate sheets used for reprinting in the image forming apparatus 101, 102, and notifies the image forming apparatus 101, 102 of the determination as sheet information.

FIGS. 8A to 8C illustrate three reprocessing commands in order to contain the information on sheet feeding (sheet feeding information) in a reprocessing command.

A command 6104 is the first exemplary reprocessing command transmitted from the post-processing apparatus 103 to the image forming apparatus 101 or 102. Type="ResubmitQueueEntry" is described in 61041 to be a reprocessing command to instruct the image forming apparatus 101 or 102 to reprint.

Further, 61042 is described to be a reprocessing command including the type of sheets to be reprinted. The type of sheets may be information input by the user via the operation unit 304, and may be information automatically determined from the failure contents of the post-processing apparatus 103 by the post-processing apparatus 103. A plurality of types of sheets may be listed as candidates for reprint.

61043 is described to be a reprocessing command including whether sheets with the type of sheets described in 61042 are present in a sheet feeder in the image forming apparatus 101, 102. Level="NG" is described to indicate that the sheets are not present in a sheet feeder in the image forming apparatus 101, 102, and Level="OK" is described to indicate that the sheets are present in a sheet feeder in the image forming apparatus 101, 102.

A command 6105 is the second exemplary reprocessing command transmitted from the post-processing apparatus 103 to the image forming apparatus 101 or 102. Similarly to the command 6104, Type="ResubmitQueueEntry" is described in 61051 to be a reprocessing command to instruct the image forming apparatus 101, 102 to reprint. 61052 is described to be a reprocessing command including the sheet type for reprint.

Further, 61053 is described to be a reprocessing command including whether sheets with the sheet type described in 61052 needs to be fed to a sheet feeder in the image forming apparatus 101, 102. Insert="Yes" is described to indicate that the sheets need to be fed to a sheet feeder in the image forming apparatus 101, 102. Insert="No" is described to indicate that the sheets do not need to be fed to a sheet feeder in the image forming apparatus 101, 102.

Whether sheets need to be fed to the image forming apparatus 101, 102 is determined on the basis of the types and numbers of sheets inserted in the sheet feeders in the image forming apparatus 101, 102, and the information on the print jobs in progress and idling in the image forming apparatus 101, 102. In this way, according to the present embodiment, the necessity of sheet feeding or the number of sheets to be fed can be determined in consideration of the sheets consumed in a print job in progress or to be processed in the image forming apparatus.

A command 6106 is the third exemplary reprocessing command transmitted from the post-processing apparatus 103 to the image forming apparatus 101, 102. Similarly to the commands 6104 and 6105, Type="ResubmitQueueEntry" is described in 61061 to be a reprocessing command to instruct the image forming apparatus 101, 102 to reprint. 61062 is described to be a reprocessing command including the type of sheets to be reprinted.

61063 is described to be a reprocessing command including how many sheets with the type of sheets described in 61062 need to be fed to which sheet feeder in the image forming apparatus 101, 102. Location="Tray-1" is described to indicate that the sheets need to be fed to the sheet feeder with the name of Tray-1, and SetAmount="150" indicates that 150 sheets need to be additionally fed.

How many sheets need to be fed to which sheet feeder is calculated on the basis of the types and numbers of sheets inserted in the sheet feeders in the image forming apparatus 101, 102 and the information on the print jobs in progress and idling in the image forming apparatus 101, 102.

The command description methods in FIGS. 6A to 8C are exemplary, and other description method may be employed. The image forming apparatus 101, 102 may exchange commands with the post-processing apparatus 103 and the information processing apparatus 104 by use of commands other than the described ones. The commands exchanged between the image forming apparatus 101, 102 and the post-processing apparatus 103 or the information processing apparatus 104 are illustrated, but the commands may be exchanged between the image forming apparatus 101, 102 and other different apparatuses from the post-processing apparatus 103 and the information processing apparatus 104.

<Processing Sequence of Instructing to Re-perform Print Processing>

Figure 9:
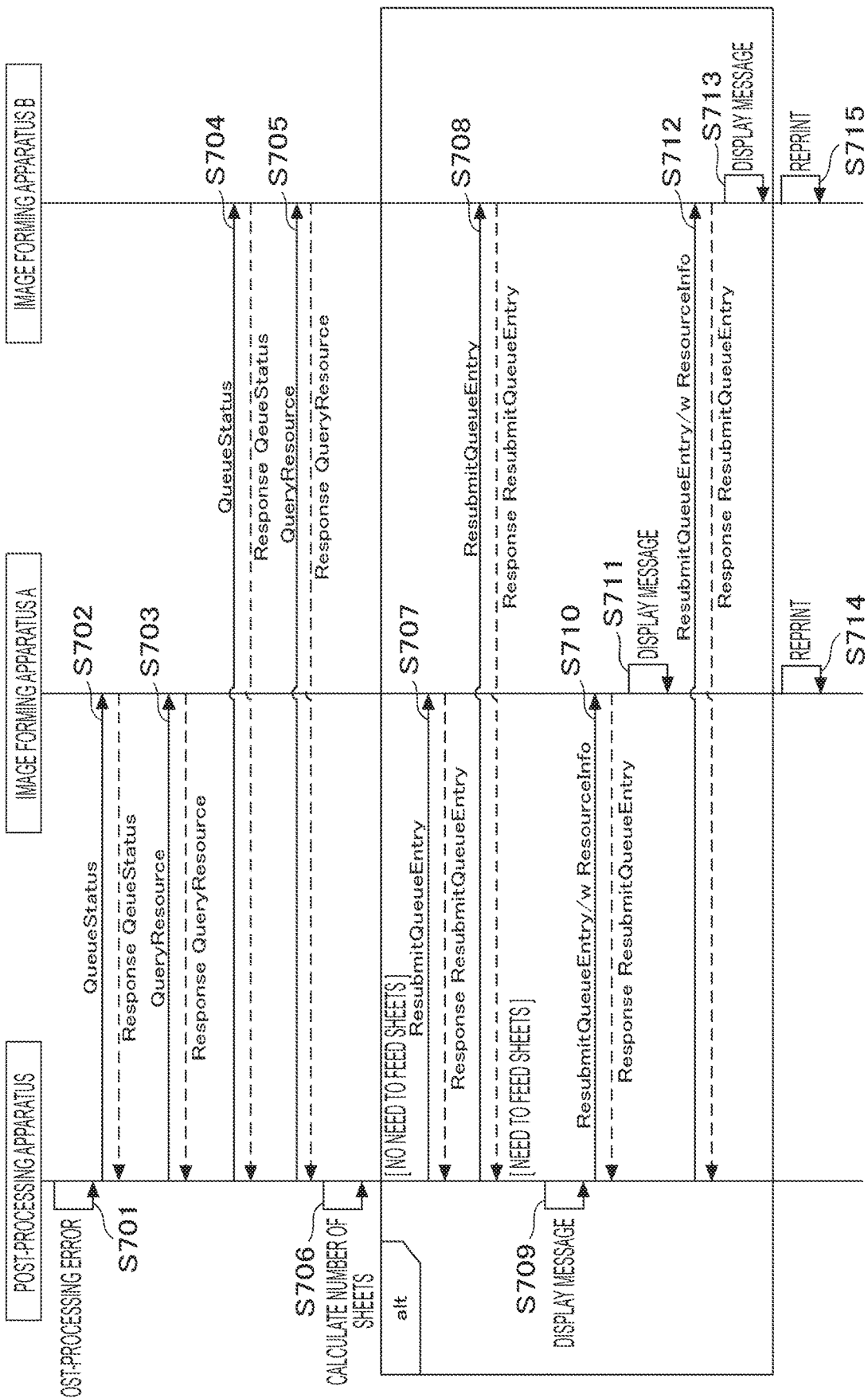
FIG. 9 is a diagram illustrating a processing sequence for instructing to re-perform a print processing.

FIG. 9 is a sequence diagram illustrating a flow of the processings communicated between the image forming apparatuses 101 and 102 and the post-processing apparatus 103 by use of the commands of FIGS. 6A to 8C in the information processing system according to the present embodiment.

FIG. 9 illustrates that printed materials output from the two image forming apparatuses 101 and 102 are combined to be post-processed into an adhesively-bound book in the post-processing apparatus 103 by way of example.

The two image forming apparatuses 101 and 102 are illustrated as an image forming apparatus A for printing the front cover and an image forming apparatus B for printing the text, respectively. The sequence in the two image forming apparatuses and the post-processing apparatus 103 is illustrated, but is not limited to the illustrated one. The disclosure is applicable also when communication is made in combinations of the image forming apparatuses A and B, the post-processing apparatus 103, the information processing apparatus 104, and the same apparatuses of them. For example, a combination of the post-processing apparatus A and the post-processing apparatus B, a combination of the information processing apparatus 104, the image forming apparatuses 101 and 102, and the post-processing apparatus 103, and the like may be employed.

In S701, the post-processing apparatus 103 detects that a failure (error) occurs in the post-processing of performing adhesive binding. In S702, the post-processing apparatus 103 transmits the apparatus status reception command ("QueryStatus" command) indicated in the command 6100 of FIG. 6A to the image forming apparatus A thereby to query about the status of the image forming apparatus A. When receiving the apparatus status reception command, the image forming apparatus A transmits a response command indicated in the response 6101 of FIG. 6B to the post-processing apparatus 103. In the example, the response command includes the job information for printing the front cover.

In S703, the post-processing apparatus 103 transmits the resource information reception command ("QueryResource" command) indicated in the command 6102 of FIG. 7A to the image forming apparatus A thereby to query about the resource information of the image forming apparatus A. When receiving the resource information reception command, the image forming apparatus A transmits a response command indicated in the response 6103 of FIG. 7B to the post-processing apparatus 103. The resource information includes the sheet information of the sheet feeders, and thus the post-processing apparatus 103 queries about the resource information thereby to acquire the information on the sheets for printing the front cover.

Similarly as in S702, in S704, the post-processing apparatus 103 transmits the apparatus status reception command ("QueryStatus" command) indicated in the command 6100 of FIG. 6A to the image forming apparatus B. The image forming apparatus B transmits a response command indicated in the response 6101 of FIG. 6B to the post-processing apparatus 103 in response to the apparatus status reception command. In the example, the response command includes the job information for printing the text.

Similarly as in S703, in S705, the post-processing apparatus 103 transmits the resource information reception command ("QueryResource" command) indicated in the command 6102 of FIG. 7A to the image forming apparatus B. The image forming apparatus B transmits a response command indicated in the response 6103 of FIG. 7B to the post-processing apparatus 103 in response to the resource information reception command. Thereby, the post-processing apparatus 103 can acquire the information on the sheets for printing the text as resource information.

In S706, the conditions for reprint in the image forming apparatus A and the image forming apparatus B are determined in order to recover the post-processing in which the post-processing apparatus 103 fails. The conditions for reprint are the type and number of sheets used for reprint, for example. The post-processing apparatus 103 then determines whether sheets need to be fed to the image forming apparatus A and the image forming apparatus B on the basis of the information received in S702 to S705, and calculates how many sheets with which type are required when sheets need to be fed.

For example, it is assumed that when 100 sheets A need to be reprinted in the image forming apparatus A, 30 sheets A are already inserted in a sheet feeder in the image forming apparatus A and 20 sheets A are to be used in the print job in the image forming apparatus A. At this time, the post-processing apparatus 103 determines that the sheets A need to be fed to the sheet feeder in the image forming apparatus A on the basis of the number of sheets A already inserted in the image forming apparatus A and the number of sheets A to be used in the print job in the image forming apparatus A. Further, the post-processing apparatus 103 determines that 50 sheets A need to be fed to the sheet feeder in the image forming apparatus A.

As a result of S706, when the post-processing apparatus 103 determines that sheets do not need to be fed to the image forming apparatus A, in S707, the post-processing apparatus 103 transmits the reprocessing command ("ResubmitQueueEntry" command) indicated in the command 6104 of FIG. 8A to the image forming apparatus A. Sheets do not need to be fed to the image forming apparatus A, and thus Level="OK" is described in 61043.

In S707, the command 6105 or the command 6106 may be transmitted as a reprocessing command as described in FIGS. 8A to 8C. In this case, each reprocessing command may be described not to set Insert="No" in 61053 and ResourceInfo node in 61063 in order to indicate that sheets do not need to be fed to the image forming apparatus A.

Similarly, as a result of S706, when the post-processing apparatus 103 determines that sheets do not need to be fed to the image forming apparatus B, in S708, the post-processing apparatus 103 transmits the reprocessing command indicated in the command 6104 of FIG. 8A to the image forming apparatus B. Similarly as in S707, sheets do not need to be fed to the image forming apparatus B, and thus Level="OK" is described in 61043. Similarly as in S707, in S708, the command 6105 or the command 6106 may be transmitted as a reprocessing command.

On the other hand, as a result of S706, when the post-processing apparatus 103 determines that sheets need to be fed to the image forming apparatus A or the image forming apparatus B, in S709, the post-processing apparatus 103 displays a message that sheets need to be fed to the image forming apparatus A or B on the operation unit 304. It is assumed herein that the post-processing apparatus 103 is performing (continuing) the post-processing corresponding to the print job of reprinting in the image forming apparatuses A and B and the user is operating in the post-processing apparatus 103, and thus S709 is performed.

In other words, when the post-processing of the print job, which is the target of the message that sheets need to be fed, is being performed in the post-processing apparatus, S709 is performed. However, the processing is not limited thereto, and S709 may not be performed. As described below, the message that sheets need to be fed to the image forming apparatus A or B is displayed also on the image forming apparatus A or B (S711 or S713).

That is, the message may be displayed on any apparatus and the message may be displayed on all the apparatuses as far as the user is notified of the message. When the user confirms the message on any apparatus, displaying the message may be terminated in the other apparatuses. The user interface displayed in S709 will be described below with reference to FIGS. 12A to 12C.

As a result of S706, when the post-processing apparatus 103 determines that sheets need to be fed to the image forming apparatus A, in S710, the post-processing apparatus 103 transmits the reprocessing command ("ResubmitQueueEntry" command) indicated in the command 6104 of FIG. 8A to the image forming apparatus A. Sheets need to be fed to the image forming apparatus A, and thus Level="NG" is described in 61043.

In S710, the command 6105 or the command 6106 may be transmitted as a reprocessing command as described in FIGS. 8A to 8C. In this case, the information on the sheets to be fed may be described by setting Insert="Yes" in 61053 and ResourceInfo node in 61063 in order to indicate that sheets need to be fed to the image forming apparatus A.

In S711, the image forming apparatus A displays a message that sheets need to be fed to the image forming apparatus A on the operation unit 204. Similarly, as a result of S706, when the post-processing apparatus 103 determines that sheets need to be fed to the image forming apparatus B, in S712, the post-processing apparatus 103 transmits the reprocessing command in the command 6104 of FIG. 8A to the image forming apparatus B.

Similarly as in S710, sheets need to be fed to the image forming apparatus B, and thus Level="NG" is described in 61043. Similarly as in S710, in S712, the command 6105 or the command 6106 may be transmitted as a reprocessing command.

In S713, the image forming apparatus B displays a message that sheets need to be fed to the image forming apparatus B on the operation unit 204. In S714 and S715, the image forming apparatuses A and B each perform the reprinting processing, respectively. As a result of S706, when the post-processing apparatus 103 determines that sheets need to be fed to the image forming apparatus A or B, the respective apparatuses recognize that sheets are fed, and then perform the reprinting processing.

<Flowchart of Processings in Post-processing Apparatus>

Figure 10:
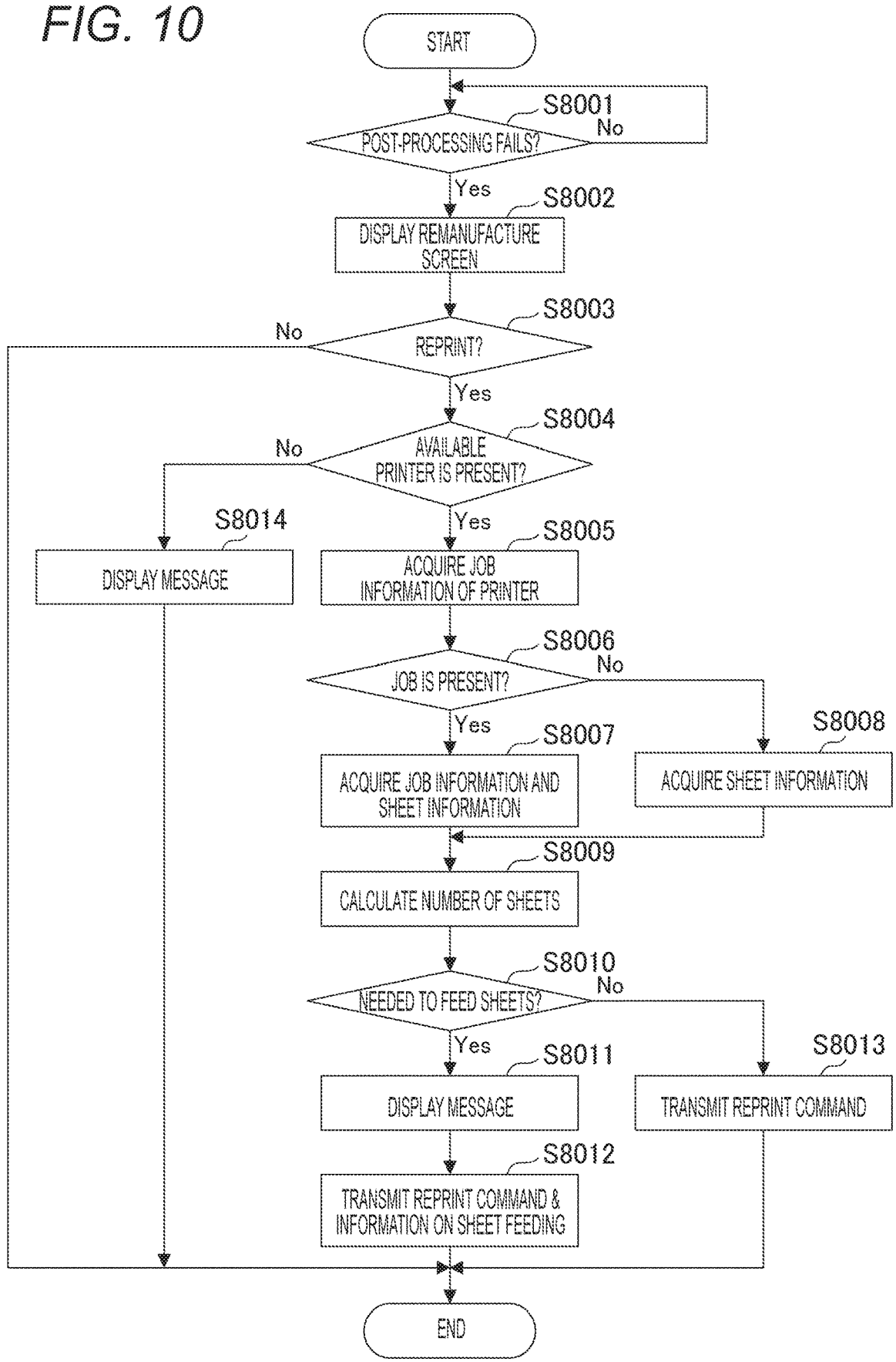
FIG. 10 is a flowchart of the processings in the post-processing apparatus.

FIG. 10 is a flowchart for explaining the processings after the post-processing apparatus 103 according to the present embodiment fails in a post-processing and until the post-processing apparatus 103 instructs the image forming apparatus 101 or 102 to re-perform the failed print job.

A program for each flow is stored in the storage unit 311 in the post-processing apparatus 103, and is read by the RAM 309 to be executed by the CPU 308.

In S8001, the device control unit 5205 determines whether a failure (error) occurs in the post-processing in the post-processing unit 5208. When the device control unit 5205 determines that a failure occurs in the post-processing, the processing proceeds to S8002. In S8002, the device control unit 5205 displays a user interface by which the user gives an instruction on remanufacture on the operation unit 304. An exemplary user interface for giving an instruction on remanufacture will be described below with reference to FIG. 13.

In S8003, the device control unit 5205 determines whether the remanufacture on which an instruction is given in S8002 is reprint. When the device control unit 5205 determines that an instruction is given on reprint, the processing proceeds to S8004, and when the device control unit 5205 determines that an instruction is given on remanufacture other than reprint, the processing in the flowchart of FIG. 10 is terminated.

In S8004, the device control unit 5205 determines whether an image forming apparatus capable of reprinting is present. The determination is made on the basis of the status of an image forming apparatus acquired in the response of the image forming apparatus to the apparatus status reception command ("QueryStatus" command) of FIG. 6A, for example. When the device control unit 5205 determines that an image forming apparatus capable of reprinting is present, the processing proceeds to S8005, and when the device control unit 5205 determines that an image forming apparatus capable of reprinting is not present, the processing proceeds to S8014.

In S8005, the device control unit 5205 instructs the job control unit 5204 to reprint. The instructed job control unit 5204 transmits the apparatus status reception command ("QueryStatus" command) of FIG. 6A generated via the command generation unit 5203 to the image forming apparatus which is determined to be able to reprint in S8004 via the communication processing unit 5201. Thereby, the post-processing apparatus 103 can acquire, as a response to the apparatus status reception command, the information on the print jobs in progress or idling in the image forming apparatus which is to reprint.

In S8006, the job control unit 5204 determines whether a print job is present in the image forming apparatus on the basis of the information on the print jobs in the image forming apparatus acquired in S8005. When the job control unit 5204 determines that a print job is present in the image forming apparatus, the processing proceeds to S8007, and when the job control unit 5204 determines that a print job is not present in the image forming apparatus, the processing proceeds to S8008.

In S8007, the job control unit 5204 transmits the apparatus status reception command of FIG. 6A and the resource information reception command of FIG. 7A generated via the command generation unit 5203 to the image forming apparatus via the communication processing unit 5201. Thereby, the post-processing apparatus 103 can acquire the information on the print jobs in progress or idling in the image forming apparatus and the sheet information of the sheet feeders in the image forming apparatus. The acquired sheet information of the sheet feeders is stored in the sheet information management unit 5209.

On the other hand, in S8008, the job control unit 5204 transmits the resource information reception command of FIG. 7A generated via the command generation unit 5203 to the image forming apparatus via the communication processing unit 5201. Thereby, similarly as in S8007, the post-processing apparatus 103 can acquire the sheet information of the sheet feeders in the image forming apparatus. The acquired sheet information of the sheet feeders is stored in the sheet information management unit 5209.

In S8009, the job control unit 5204 calculates how many sheets need to be fed to which sheet feeder in the image forming apparatus on the basis of the information acquired in S8007 or S8008. In S8010, the job control unit 5204 determines whether sheets need to be fed to the image forming apparatus on the basis of the calculation result in S8009. When the job control unit 5204 determines that sheets need to be fed to the image forming apparatus, the processing proceeds to S8011, and when the job control unit 5204 determines that sheets do not need to be fed to the image forming apparatus, the processing proceeds to S8013.

In S8011, the job control unit 5204 displays a message that sheets need to be fed to the image forming apparatus on the operation unit 304. An exemplary message to be displayed will be described below with reference to FIGS. 12A to 12C. In S8012, the job control unit 5204 transmits the reprocessing command in FIGS. 8A to 8C ("ResubmitQueueEntry" command) generated via the command generation unit 5203 to the image forming apparatus via the communication processing unit 5201. The reprocessing command transmitted in S8012 includes the information on sheet feeding such as type and number of sheets to be fed, and a sheet feeder to be set as described in FIGS. 8A to 8C.

On the other hand, in S8013, the job control unit 5204 transmits the reprocessing command in FIGS. 8A to 8C ("ResubmitQueueEntry" command) generated via the command generation unit 5203 to the image forming apparatus via the communication processing unit 5201. The reprocessing command transmitted in S8013 does not include the information on sheet feeding as described in FIGS. 8A to 8C.

In S8014, the device control unit 5205 displays a message that an image forming apparatus capable of printing is not present on the operation unit 304. An exemplary message to be displayed will be described below with reference to FIG. 14.

The present embodiment has been described assuming that the user gives an instruction to reprint via the operation unit 304 for a failure (error) of the post-processing in the post-processing apparatus 103 (S8002), but is not limited thereto. For example, the post-processing apparatus 103 may automatically determine the type of remanufacture, and give an instruction to reprint for an error.

<Flowchart of Processings in Image Forming Apparatus>

Figure 11:
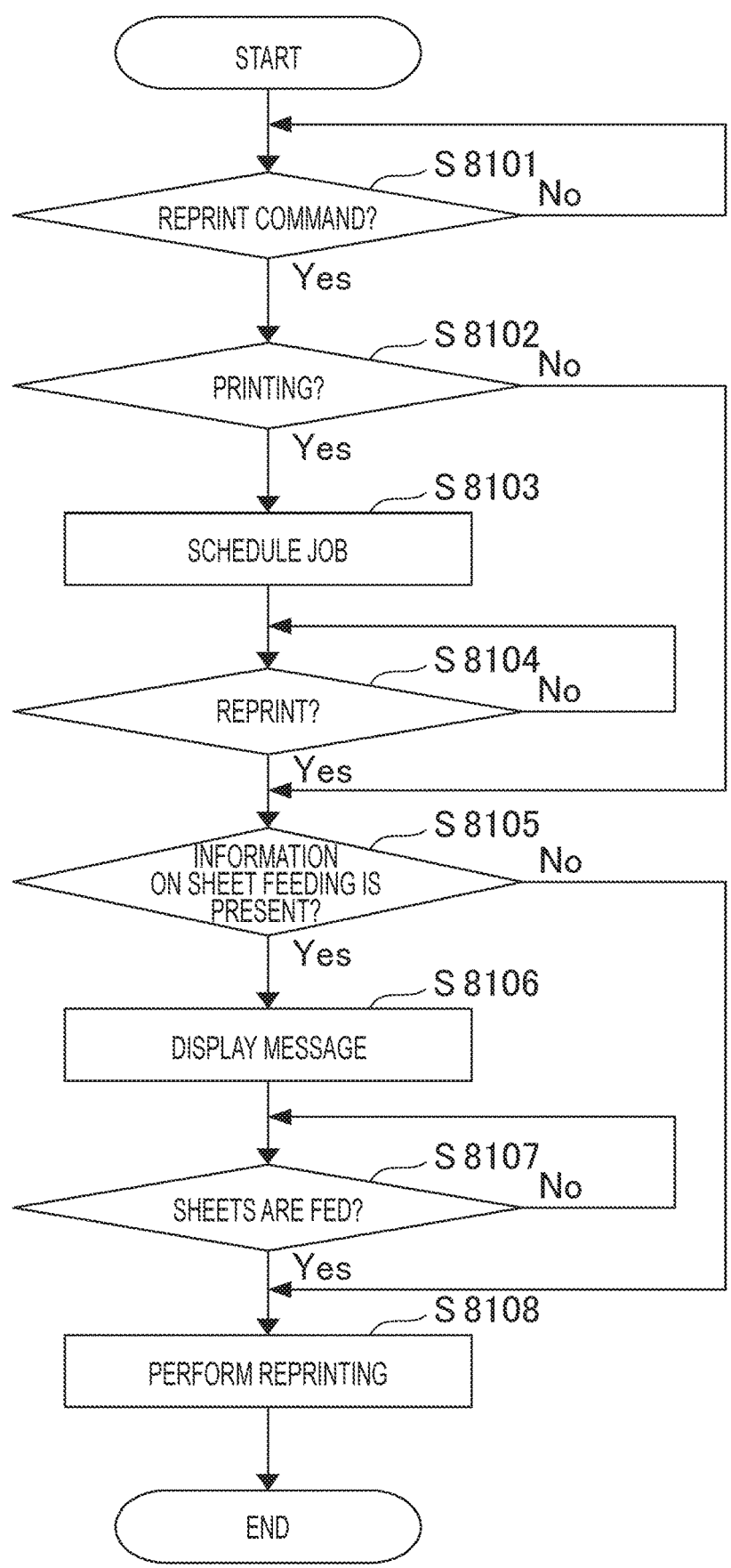
FIG. 11 is a flowchart of the processings in the image forming apparatus.

FIG. 11 is a flowchart for explaining the processings after the image forming apparatus 101, 102 according to the present embodiment receives a reprocessing command from the post-processing apparatus 103 and until it performs the reprinting processing.

A program for each flow is stored in the storage unit 212 in the image forming apparatus 101, 102, and is read by the RAM 210 to be executed by the CPU 209.

In S8101, the job control unit 5102 determines whether the reprocessing command is received from the post-processing apparatus 103. When the job control unit 5102 determines that the reprocessing command is received, the processing proceeds to S8102. In S8102, the job control unit 5102 determines whether the image forming unit 5108 is performing the print processing via the device control unit 5101. When the job control unit 5102 determines that the image forming unit 5108 is performing the print processing, the processing proceeds to S8103, and when the job control unit 5102 determines that the image forming unit 5108 is not performing the print processing, the processing proceeds to S8105.

In S8103, the job control unit 5102 schedules the print job of reprinting indicated by the reprocessing command received in S8101. Specifically, the job control unit 5102 asks the job information management unit 5106 to add the print job of reprinting indicated by the reprocessing command to the job list (not illustrated) managed by the job information storage unit 5107.

In S8104, the job control unit 5102 determines whether to perform the print processing in the print job of reprinting scheduled in S8103. That is, the job control unit 5102 determines whether the print job scheduled in S8103 is at the top of the job list. When the job control unit 5102 determines to perform the print processing in the print job of reprinting, the processing proceeds to S8105.

In S8105, the job control unit 5102 determines whether the information on sheet feeding is included in the reprocessing command received in S8101. Specifically, the job control unit 5102 determines whether ResourceInfo node is set in the reprocessing command ("ResubmitQueueEntry" command) of FIGS. 8A to 8C. When the job control unit 5102 determines that the information on sheet feeding is included in the reprocessing command, the processing proceeds to S8106, and when the job control unit 5102 determines that the information on sheet feeding is not included in the reprocessing command, the processing proceeds to S8108.

In S8106, the job control unit 5102 displays a message that sheets need to be fed to the image forming apparatus which executes the reprocessing command on the operation unit 304. The user interface displayed in S8106 will be described below with reference to FIGS. 12A to 12C. In S8106, the job control unit 5102 may change the timing to display the message depending on the print status of the image forming apparatus.

For example, the job control unit 5102 may change the timing to display the message depending on whether the image forming apparatus executing the reprocessing command is performing any print job, the contents of a print job in progress when the print job is being performed, or the like.

This is because sheets may not be immediately fed even if the message that sheets need to be fed is displayed while a different print job from the print job in the reprocessing command is in progress in the image processing apparatus executing the reprocessing command, for example. In such a case, there may be displayed a message that sheets need to be fed after the different print job is terminated or after the print job in the reprocessing command is executable.

Sheets can be immediately fed when sheets with the same type of sheets used for the print job in the reprocessing command are used or a sheet feeder is empty in the different print job, and thus the message may be displayed irrespective of the status of the image forming apparatus. Further, sheets can be immediately fed when no print job is in progress in the image forming apparatus executing the reprocessing command or while the print job of reprinting is being performed, and thus the message may be displayed irrespective of the status of the image forming apparatus.

In S8107, the job control unit 5102 determines whether sheets used for the print job of reprinting are fed to the sheet feeder in the image forming apparatus executing the print job via the sheet information management unit 5109. When the job control unit 5102 determines that the sheets are fed to the sheet feeder, the processing proceeds to S8108. In S8108, the job control unit 5102 instructs the device control unit 5101 to reprint. The image forming unit 5108 then performs the reprinting processing.

<User Interface of Message Indicating Information on Sheet Feeding>

Figure 12A:
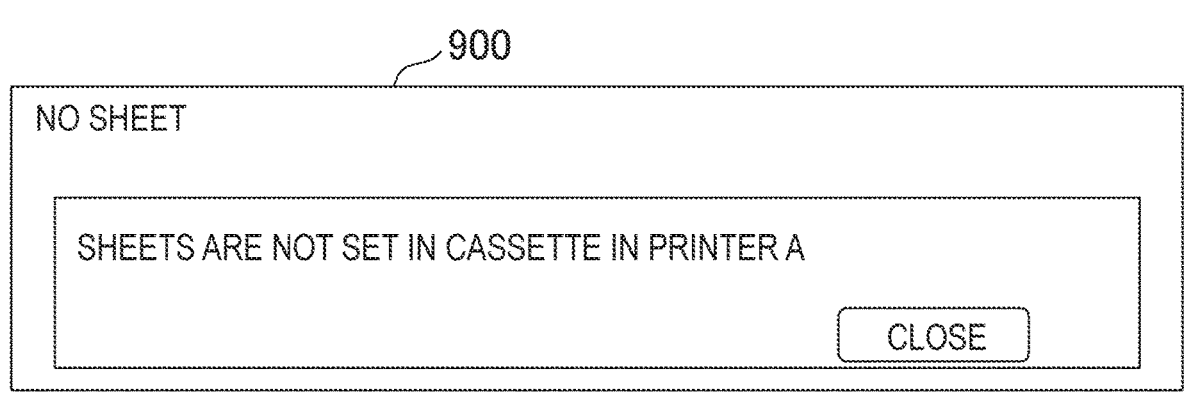
FIGS. 12A to 12C are diagrams illustrating exemplary messages indicating information on sheet feeding.
Figure 12B:
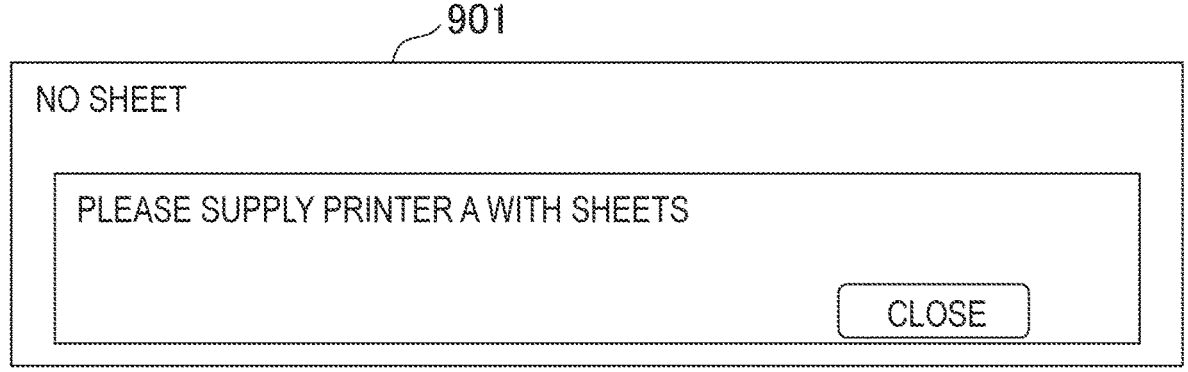
Figure 12C:
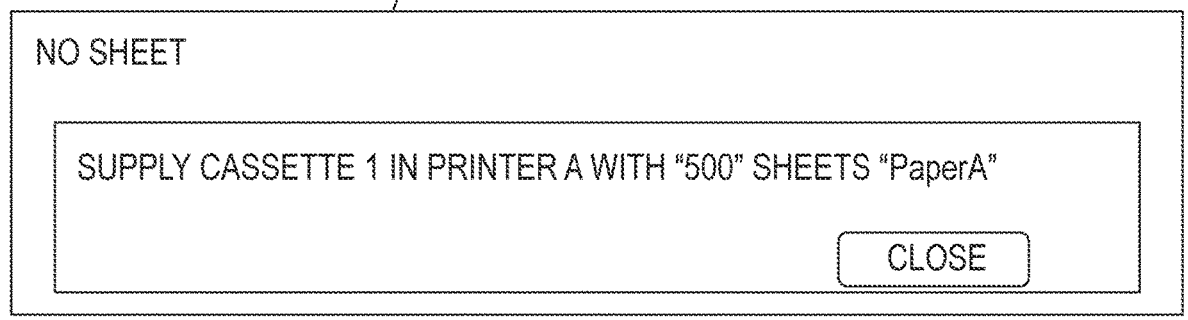

FIGS. 12A to 12C illustrate an exemplary user interface for displaying a message indicating the information on sheet feeding on the operation unit 204 in the image forming apparatus 101, 102 and the operation unit 304 in the post-processing apparatus 103 in the information processing system according to the present embodiment.

A message 900 of FIG. 12A indicates that sheets for reprint are not inserted in the sheet feeders in the image forming apparatus 101, 102. The message is created on the basis of the information on sheet feeding included in the command 6104 of FIG. 8A. Specifically, the message is displayed when sheets with the type of sheets for reprint in 61043 included in the command 6104 are not present in the sheet feeders in the image forming apparatus which is to reprint (Level="NG").

A message 901 of FIG. 12B is directed to promote to feed sheets to a sheet feeder in the image forming apparatus 101, 102. The message is created on the basis of the information on sheet feeding included in the command 6105 of FIG. 8B. Specifically, the message is displayed when sheets with the type of sheets for reprint in 61053 included in the command 6105 need to be fed to a sheet feeder (Insert="Yes").

A message 902 of FIG. 12C is directed to promote to feed sheets to a sheet feeder in the image forming apparatus 101, 102, and indicates how many sheets with which sheet type need to be fed to which sheet feeder. The message is created on the basis of the information on sheet feeding included in the command 6106 of FIG. 8C.

Specifically, the message is displayed when there is set how many sheets with the type of sheets for reprint in 61063 included in the command 6106 need to be fed to which sheet feeder in the image forming apparatus which is to reprint. The messages 900 to 902 may display other information on sheet feeding such as type of sheets to be fed.

<User Interface for Giving Instruction on Remanufacture>

FIG. 13 illustrates an exemplary user interface for giving an instruction on remanufacture displayed on the operation unit 304 when the post-processing apparatus 103 fails in a post-processing in the information processing system according to the present embodiment.

As illustrated in FIG. 13, a user interface 1000 for giving an instruction on remanufacture includes controls 10001 to 10003. The control 10001 is directed to designate a place to recover for remanufacture. The place to recover for remanufacture is the post-processing apparatus 103 or the image forming apparatus 101, 102, for example.

The control 10002 is directed to designate a work for remanufacture or the type of remanufacture. The work for remanufacture is to continue the post-processing, to reset the post-processing, to recreate data for the post-processing, to wait until completion of all manufacture, and to perform the reprinting processing, for example.

The control 10003 is directed to set the details of the work selected in the control 10002. When the control 10003 is pressed, another screen (not illustrated) is displayed. When the work selected in the control 10003 is reprint, the number or type of sheets to be reprinted can be designated in the control 10003, for example.

<User Interface of Error Message>

Figure 14:
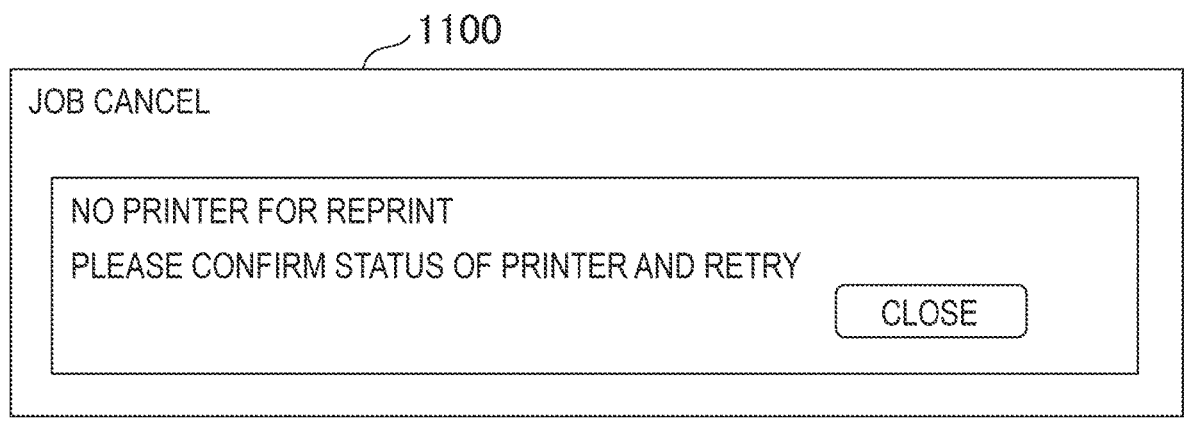
FIG. 14 is a diagram illustrating an exemplary error message.

FIG. 14 illustrates an exemplary user interface for displaying an error message that an image forming apparatus for reprinting is not present in the information processing system according to the present embodiment. A user interface 1100 is displayed in a case where an image forming apparatus capable of performing the print job of reprinting is not present (S8004 in FIG. 10) when an instruction is given on reprint in the user interface 1000 for giving an instruction on remanufacture of FIG. 13, for example.

As described above, according to the present embodiment, sheets can be appropriately promoted to feed to an image forming apparatus on the basis of the processings in the post-processing apparatus in the information processing system including the image forming apparatus and the post-processing apparatus for post-processing the output materials from the image forming apparatus. For example, when the post-processing apparatus fails in a post-processing and instructs the image forming apparatus to reprint in the corresponding print job, the sheet feeders in the image forming apparatus can be notified of the information on sheet feeding. The image forming apparatus can promote the user to feed sheets on the basis of the information notification of which is provided, and the user can appropriately and easily perform the sheet feeding work.

The present embodiment has been described assuming that when the post-processing apparatus fails in a post-processing and instructs the image forming apparatus to reprint in the corresponding print job, the image forming apparatus is notified of the information on sheet feeding, but is not limited thereto. The disclosure is applicable when the post-processing apparatus or other information processing apparatus instructs the image forming apparatus to perform any print job, and sheets can be appropriately promoted to feed when sheets need to be fed to the image forming apparatus.

According to the embodiment described above, sheets can be appropriately promoted to feed to the image forming apparatus on the basis of the processings in the post-processing apparatus in the information processing system including the image forming apparatus and the post-processing apparatus for post-processing the output materials from the image forming apparatus.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-154600, filed Aug. 9, 2017, which is hereby incorporated by reference herein in its entirety.

What is claimed is:

1. An information processing system comprising an image forming apparatus and a post-processing apparatus,
wherein the post-processing apparatus includes:
a post-processing unit configured to post-process output materials from the image forming apparatus;
a receiving unit configured to receive an instruction for reprinting of a job for which printing has already been performed at the image forming apparatus;
an acquisition unit configured to acquire sheet information of sheet feeders in the image forming apparatus;
a determination unit configured to determine whether sheets used in a print job of reprinting that the image forming apparatus is instructed to perform need to be fed on the basis of the acquired sheet information; and
a transmission unit configured to transmit information on the sheet feeding together with the instruction for reprinting to the image forming apparatus when it is determined that the sheets need to be fed,
wherein the post-processing apparatus is not connected to the image forming apparatus via a sheet conveyance path.

2. The information processing system according to claim 1,
wherein the sheet information includes information indicating the types and numbers of sheets inserted in the sheet feeders in the image forming apparatus.

3. The information processing system according to claim 1,
wherein the information on sheet feeding includes information indicating the type and number of sheets to be fed, and in which sheet feeder the sheets are to be inserted.

4. The information processing system according to claim 1,
wherein the status of the image forming apparatus includes information on a print job in progress and a print job idling in the image forming apparatus.

5. The information processing system according to claim 1,
wherein the image forming apparatus includes a display control unit configured to display a message that sheets need to be fed on a display in the image forming apparatus on the basis of the information on sheet feeding transmitted from the post-processing apparatus.

6. The information processing system according to claim 5,
wherein when receiving an instruction to perform a print job of reprinting transmitted from the post-processing apparatus,
the display control unit in the image forming apparatus displays the message that sheets need to be fed on the display when a print job is not being performed or when a print job using sheets with the same type as the type of sheets used in the print job of reprinting is being performed, and
displays the message that sheets need to be fed on the display after the print job of reprinting becomes executable in the image forming apparatus when a print job using sheets with a different type from the type of sheets used in the print job of reprinting is being performed.

7. The information processing system according to claim 1,
wherein when instructing the image forming apparatus to perform a print job of reprinting, the post-processing apparatus includes a display control unit configured to display a message that sheets need to be fed on a display in the post-processing apparatus when it is determined that sheets used in the print job of reprinting need to be fed and a post-processing corresponding to the print job is being performed in the post-processing apparatus.

8. The information processing system according to claim 1,
wherein an instruction unit transmits a JDF command to instruct the image forming apparatus to perform a print job, the JDF command including the information on sheet feeding.

9. The information processing system according to claim 1,
wherein, in a case where it is not determined that the sheets need to be fed, the transmission unit transmits the instruction for reprinting without transmitting the information on the sheet feeding.

10. The information processing system according to claim 1,
wherein the acquisition unit further acquires a status of the image forming apparatus, and
wherein the determination unit determines whether the sheets used in the print job of reprinting that the image forming apparatus is instructed to perform need to be fed on the basis of the acquired status and the acquired sheet information.

11. A method for controlling an information processing system including an image forming apparatus and a post-processing apparatus, the method comprising:
post-processing output materials from the image forming apparatus;
receiving an instruction for reprinting of a job for which printing has already been performed at the image forming apparatus;
acquiring sheet information of sheet feeders in the image forming apparatus;
determining, by the post-processing apparatus, whether sheets used in a print job of reprinting that the image forming apparatus is instructed to perform need to be fed on the basis of the acquired sheet information; and
transmitting information on the sheet feeding together with the instruction for reprinting to the image forming apparatus
when it is determined that the sheets need to be fed,
wherein the post-processing apparatus is not connected to the image forming apparatus via a sheet conveyance path.

12. A post-processing apparatus for post-processing output materials from an image forming apparatus, the post-processing apparatus comprising:

a post-processing unit configured to post-process output materials from the image forming apparatus;

a receiving unit configured to receive an instruction for reprinting of a job for which printing has already been performed at the image forming apparatus;

an acquisition unit configured to acquire sheet information of sheet feeders in the image forming apparatus;

a determination unit configured to determine whether sheets used in a print job of reprinting that the image forming apparatus is instructed to perform need to be fed on the basis of the acquired sheet information; and a transmission unit configured to transmit information on the sheet feeding together with the instruction for reprinting to the image forming apparatus when it is determined that the sheets need to be fed, wherein the post-processing apparatus is not connected to the image forming apparatus via a sheet conveyance path.

13. The post-processing apparatus according to claim 12, wherein the sheet information includes information indicating the types and numbers of sheets inserted in the sheet feeders in the image forming apparatus.

14. The post-processing apparatus according to claim 12, wherein the information on sheet feeding includes information indicating the type and number of sheets to be fed, and in which sheet feeder the sheets are to be inserted.

15. The post-processing apparatus according to claim 12, wherein the status of the image forming apparatus includes information on a print job in progress and a print job idling in the image forming apparatus.

* * * * *